United States Patent
Keshet et al.

(10) Patent No.: US 10,901,397 B2
(45) Date of Patent: Jan. 26, 2021

(54) MULTIFUNCTIONAL COMPONENT AND SYSTEM THEREFOR

(71) Applicant: ATOMATION NET LTD, Givatayaim (IL)

(72) Inventors: Eran Keshet, Tel Aviv (IL); Guy Weitzman, Givatayaim (IL)

(73) Assignee: ATOMATION NET LTD, Givatayim (IL)

( * ) Notice: Subject to any disclaimer, the term of this patent is extended or adjusted under 35 U.S.C. 154(b) by 370 days.

(21) Appl. No.: 15/323,428

(22) PCT Filed: Jul. 5, 2015

(86) PCT No.: PCT/IL2015/050692
§ 371 (c)(1),
(2) Date: Jan. 2, 2017

(87) PCT Pub. No.: WO2016/005967
PCT Pub. Date: Jan. 14, 2016

(65) Prior Publication Data
US 2017/0160729 A1    Jun. 8, 2017

Related U.S. Application Data (60) Provisional application No. 62/021,235, filed on Jul. 7, 2014.

(51) Int. Cl.
*A63H 30/00* (2006.01)
*G05B 19/418* (2006.01)
*A63H 30/04* (2006.01)

(52) U.S. Cl.
CPC ....... *G05B 19/41805* (2013.01); *A63H 30/04* (2013.01); *G05B 2219/33192* (2013.01)

(58) Field of Classification Search
None
See application file for complete search history.

(56) References Cited

U.S. PATENT DOCUMENTS 4,712,184 A    12/1987    Haugerud
4,840,602 A     6/1989    Rose
(Continued)

FOREIGN PATENT DOCUMENTS

DE    3009040 A1    9/1981

OTHER PUBLICATIONS

International Search Report dated Jan. 14, 2016.

*Primary Examiner* — Paul B Yanchus, III
(74) *Attorney, Agent, or Firm* — Alphapatent Associates, Ltd; Daniel J. Swirsky (57) ABSTRACT

A multifunctional component, comprising functional hardware elements for generating a desired physical action, a processor for selectively activating one or more of the functional hardware elements in response to a control signal received from a control device, a wireless communication unit in communication with the control device by which the control signal is transmitted to the processor, and a memory device in which are embedded an activation code and a mediating code being executable by the processor. The activation code is communicable with the processor by a machine type language adapted to initiate a physical output from the processor which is configured to generate the action. The mediating code may be communicable with an enhanced software developer kit (SDK) platform, for facilitating development of a dedicated application runnable on the control device with use of logic commands and the activation code by converting each of the logic commands to physical corresponding instructions representing physical (Continued)

parameters required by the activated hardware elements to generate the desired physical action.

17 Claims, 9 Drawing Sheets

(56) References Cited

U.S. PATENT DOCUMENTS

| | | | |
|---|---|---|---|
| 5,142,803 A | 9/1992 | Lang | |
| 5,191,615 A | 3/1993 | Aldava et al. | |
| 5,195,920 A | 3/1993 | Collier | |
| 5,270,480 A | 12/1993 | Hikawa | |
| 5,289,273 A | 2/1994 | Lang | |
| 5,388,493 A | 2/1995 | Curletto | |
| 2001/0031603 A1 | 10/2001 | Gabai et al. | |
| 2003/0101337 A1* | 5/2003 | Wu | G06F 3/1284 713/100 |
| 2004/0189054 A1 | 9/2004 | Chernoff et al. | |
| 2012/0168240 A1* | 7/2012 | Wilson | A63H 30/04 180/167 |
| 2013/0019019 A1 | 1/2013 | Lam | |
| 2014/0172197 A1 | 6/2014 | Ganz et al. | |
| 2014/0178847 A1 | 6/2014 | Akavia et al. | |

\* cited by examiner

MULTIFUNCTIONAL COMPONENT AND SYSTEM THEREFOR

FIELD OF THE INVENTION

The present invention relates to wireless multifunctional components. More specifically, it relates to a controllable and interactive autonomous device assembled from a plurality of the multifunctional components having embedded code, as well as to a system for controlling and developing such a device.

BACKGROUND OF THE INVENTION

Devices which are remotely controlled by wireless communication are well known in the art. Typically, such devices include an actuator whose activation is controlled by a user via a remote control device.

U.S. Pat. No. 4,712,184 to Haugerud discloses a computer controlled functional toy, the construction of which teaches the user computer terminology and programming and robotic technology. Haugerud describes computer control of a toy via a wired connection, wherein the user of the computer typically writes a simple program to control movement of a robot.

U.S. Pat. No. 4,840,602 to Rose discloses a talking doll responsive to an external signal, in which the doll has a vocabulary stored in digital data in a memory which may be accessed to cause a speech synthesizer in the doll to simulate speech.

U.S. Pat. No. 5,142,803 to Lang discloses an animated character system with real-time control.

U.S. Pat. No. 5,191,615 to Aldava et al. discloses an interrelational audio kinetic entertainment system in which movable and audible toys and other animated devices spaced apart from a television screen are provided with program synchronized audio and control data to interact with the program viewer in relationship to the television program.

U.S. Pat. No. 5,195,920 to Collier discloses a radio controlled toy vehicle which generates realistic sound effects on board the vehicle. Communication with a remote computer allows an operator to modify and add new sound effects.

U.S. Pat. No. 5,270,480 to Hikawa discloses a toy acting in response to a MIDI signal, wherein an instrument-playing toy performs simulated instrument playing movements.

U.S. Pat. No. 5,289,273 to Lang discloses a system for remotely controlling an animated character. The system uses radio signals to transfer audio, video and other control signals to the animated character to provide speech, hearing, vision and movement in real-time.

U.S. Pat. No. 5,388,493 to Curletto discloses a housing for a vertical dual keyboard MIDI wireless controller for accordionists. The system may be used with either a conventional MIDI cable connection or by a wireless MIDI transmission system.

DE 3009-040 to Neuhierl describes a device for adding the capability to transmit sound from a remote control to a controlled model vehicle. The sound is generated by means of a microphone or a tape recorder and transmitted to the controlled model vehicle by means of radio communications. The model vehicle is equipped with a speaker that emits the received sounds.

All of these prior art remotely controlled devices are configured for a specific hardware arrangement, and are not readily usable for a different usage. A new application would have to be programmed if their controller were used for a different hardware arrangement, and even if one of the actuated components were replaced.

An additional difficulty associated with these prior art remotely controlled devices is the extremely long time needed by a software developer to learn the specification of each actuated component in order to produce an application that is able to integrate the various components and produce desired actions therewith.

SUMMARY OF THE INVENTION

It is an object of the present invention to provide a controllable and interactive autonomous assembly that facilitates the interchangeability of actuated components.

It is an additional object of the present invention to provide a controllable and interactive autonomous assembly by which the time for developing an application for integrating the various actuated components and for producing desired actions therewith is significantly reduced relative to the prior art.

Other objects and advantages of the invention will become apparent as the description proceeds.

The present invention provides a multifunctional component, comprising one or more functional hardware elements for generating a desired physical action, a processor for selectively activating one or more of said functional hardware elements in response to a control signal received from a control device, a wireless communication unit in communication with said control device by which said control signal is transmitted to said processor, and a memory device in which are embedded an activation code and a mediating code being executable by said processor, wherein said activation code is communicatable with said processor by a machine type language (that may be a low level language) adapted to initiate a physical output from said processor which is configured to generate said action, and wherein said mediating code is communicatable with an enhanced software developer kit (SDK) platform, for facilitating development of a dedicated application runnable on said control device with use of high level logic commands, and with said activation code by converting each of said high level logic commands logic to physical corresponding instructions representing one or more physical parameters required by said one or more activated hardware elements to generate said desired physical action.

An autonomous assembly is also in the scope of the invention which comprises a plurality of the multifunctional components, wherein the control device is operable to coordinate the physical actions performable by the plurality of components.

The present invention is also directed to an autonomous toy, comprising one or more multifunctional and drivable wheel components, each of said wheel components comprising a housing defining a periphery of said component; a motor mounted within said housing; a power source for powering said motor; a steerable and ground engageable wheel driven by said motor; a processor for selectively activating said motor in response to a control signal received from an external control device; a wireless communication unit in communication with said control device by which said control signal is transmitted to said processor; and one or more elements for releasably securing said housing to a structure of said autonomous toy.

Said ground engageable wheel is operable to undergo first predetermined motion in response to said received control signal which is able to cooperate with the motion undergone by another ground engageable wheel of another component secured to said structure in order to produce a desired action performable by said autonomous toy. Said wheel component is detachable from the structure of a first autonomous toy and is attachable to the structure of a second autonomous toy of different functionality than said first autonomous toy, such that said ground engageable wheel is operable to undergo second predetermined motion which is able to cooperate with the motion undergone by another ground engageable wheel of another component secured to the structure of said second autonomous toy in order to produce a desired action performable by said second autonomous toy.

The present invention is also directed to a software development system, comprising a multifunctional component comprising one or more functional hardware elements for generating a desired physical action, a processor for selectively activating one or more of said hardware elements in response to a control signal received from a control device, a wireless communication unit in communication with said control device by which said control signal is transmitted to said processor, and a memory device in which are embedded an activation code and a mediating code being executable by said processor; and a computerized device on which is running an enhanced SDK platform for facilitating development of a dedicated application runnable on said control device with use of high level logic commands.

Said computerized device is capable of being coupled to said component via a data communication link to allow an object representative of said mediating code to be embedded in said enhanced SDK platform and accessed following transmission of an accession signal from said component to said computerized device, said enhanced SDK platform being configured to generate said high level logic commands following accession of said embedded object. Said activation code is communicatable with said processor by a machine type language (that may be a low level language) adapted to initiate a physical output from said processor which is configured to generate said action. Said mediating code is communicatable with said activation code by converting each of said high level logic commands to corresponding instructions representing one or more physical parameters required by said one or more activated hardware elements to generate said desired physical action, and is also communicatable with said enhanced SDK platform.

The present invention is directed to a system for controlling a remotely controlled device, comprising (a) a remotely controlled device comprising one or more functional hardware elements for generating a desired physical action; a processor for selectively activating one or more of said hardware elements in response to a wireless control signal received from a controlling device; a wireless communication unit in communication with said controlling device by which said control signal is transmitted to said processor; and a memory device in which are embedded an activation code and a mediating code being executable by said processor, wherein said activation code is communicatable with said processor by a machine type language (that may be a low level language) adapted to initiate a physical output from said processor which is configured to generate said action, wherein said mediating code is communicatable with said activation code by instructions that are suitable to interface with an enhanced SDK platform for facilitating development of a dedicated application runnable on said controlling device with use of high level logic commands; and (b) said controlling device, comprising a memory device on which is running said dedication application, wherein selective interaction with a user interface associated with said application generates said control signal that is transmittable to the communication unit of said remotely controlled device, said control signal being modulated with one of a plurality of high level logic commands that are representative of a set of operations which are performable by said device, wherein a command signal for initiating said processor output is transmittable from said mediating code to said activation code in response to transmission of said control signal.

DETAILED DESCRIPTION OF PREFERRED EMBODIMENTS

The controllable autonomous assembly of the present invention comprises a plurality of autonomous multifunctional components, each of which has one or more actuating capabilities, including but not limited to motion generation and control, location definition, light or sound emission, and energy supply; at least some of them also comprising capabilities of, but not limited to, data reception/transmission and processing, which together define the autonomous device. Two or more multifunctional components may connect to each other, without the need of a predefined structure. Also, a single multifunctional component can be used as an autonomous device, when adapted accordingly. One multifunctional component can communicate with other components within the same assembly or with other components in different assemblies, in order to exchange information and to operate specific actuators.

Figure 1:
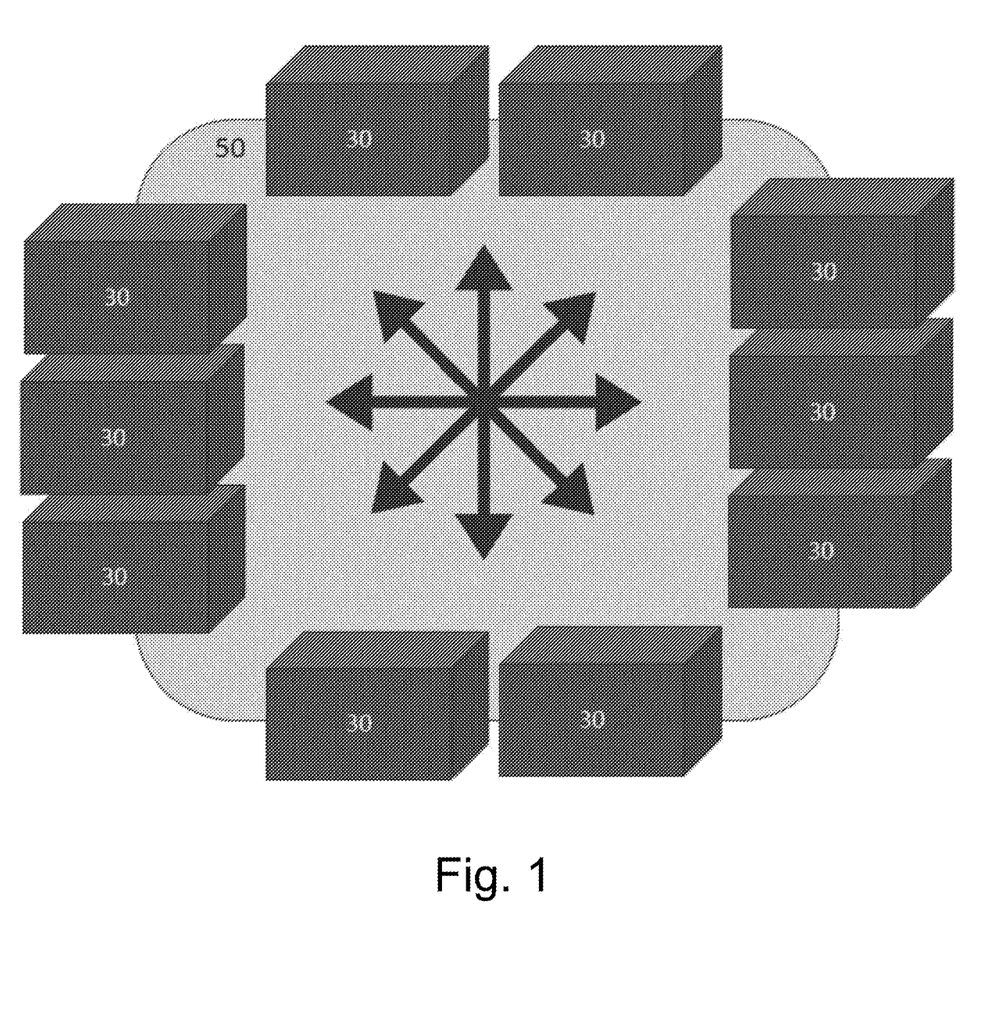
FIG. 1 is a schematic illustration of an autonomous assembly comprising a plurality of multifunctional components.

As an introduction, FIG. 1 schematically illustrates an autonomous assembly 50 comprising a plurality of multifunctional components 30. The plurality of multifunctional components 30 can be allocated in specific places in autonomous assembly 50 in order to provide the assembly with actuation properties. At least some of the components 50 comprise transmission/reception capabilities and can receive commands from a wireless device (not shown). The commands may then be transmitted to actuators located in the specific components. One example of the invention can be, and not limited to, an autonomous assembly in a form of a car with differently allocated components. Exemplary components are selected from, but not limited to, wheels, lights, and sound emitters.

Figure 2:
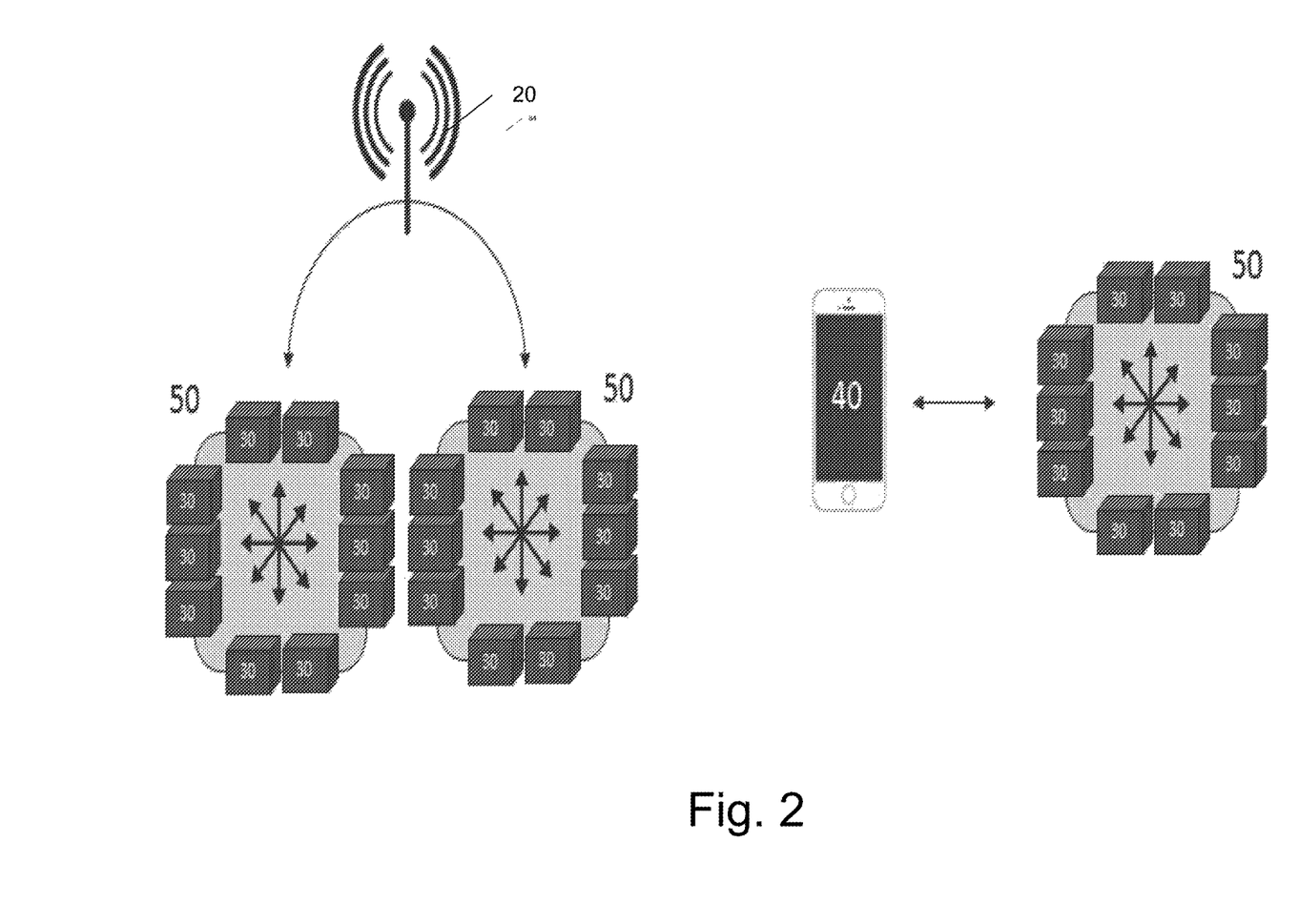
FIG. 2 is a schematic illustration of the wireless communication between an external control device and the assembly of FIG. 1, and between two assemblies of FIG. 1.

Reference is now made to FIG. 2, which schematically illustrates the wireless communication between an external control device 40 and an autonomous assembly 50, and between two autonomous assemblies 50. External control device 40 may be any mobile device such as a cellphone or a tablet, or alternatively may be a personal computer.

Two autonomous assemblies 50 in communication with wireless network 20 and having specific actuating capabilities may locate each other via wireless network 20 and be actuated when positioned within a predetermined proximity. This proximity activates an actuation response in the two autonomous assemblies 50 with use of a specific actuator embedded in each of the autonomous assemblies, for example a second actuator which is embedded in a second autonomous assembly is different than a first actuator which is embedded in a first autonomous assembly. Each of the autonomous assemblies 50 may be additionally controlled by external control device 40.

Returning to the example of a toy car, one car is designed to be a police car, and comprises components and software for generating the lights, sounds and movement of a police car. A child user, using his cellphone is playing with it in the mall. Another child user, having a second car configured to be a thief car (with all the components and software required) approaches the first child user with the police car. Since both cars are in communication with the wireless network, they can locate each other and be actuated accordingly in conjunction with the software. After being actuated, the thief car speeds away from the police car and emits sounds of shooting, while the police car pursues the thief car and emits the sounds and lights of a police car.

Alternatively, at least some autonomous assemblies 50 may identify other autonomous assemblies 50 directly, without the need of the wireless network, for example via NFC, an RFID scanner or a camera.

Figure 3:
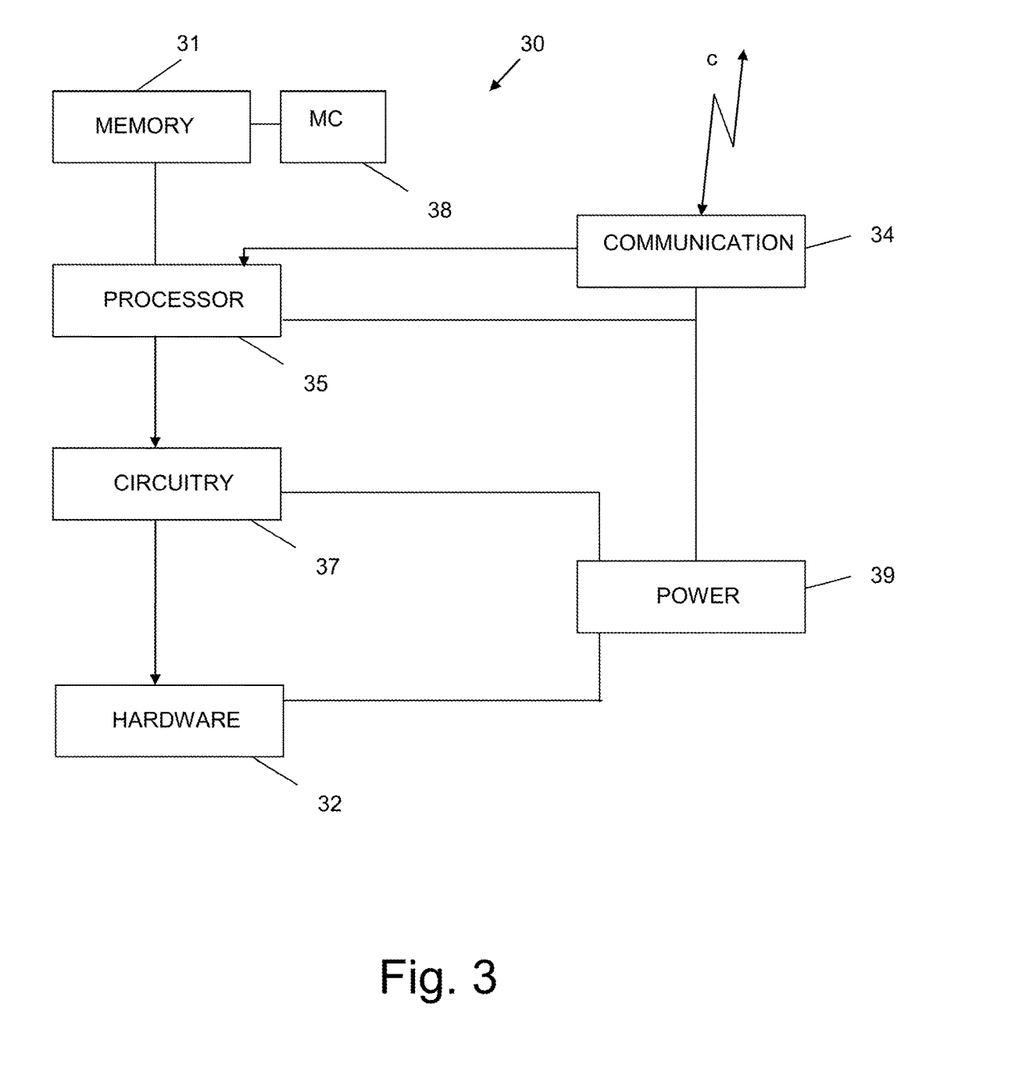
FIG. 3 is a block diagram of a multifunctional component used in conjunction with the autonomous assembly of FIG. 1, according to one embodiment of the present invention.

A block diagram of multifunctional component 30 is illustrated in FIG. 3. Multifunctional component 30 comprises one or more functional hardware elements 32 for generating a controlled physical action that is specific for a desired usage in the context of a given autonomous assembly. Non-limiting examples of a functional hardware element 32 include a wheel, transmission, a motor, a light source, a sound emitter, and a GPS component. If a functional hardware element 32 were a light source, for example, the light source would be operated differently for illuminating the surroundings of a robot advancing in the dark than for illuminating the blinking lights of a toy police car.

A functional hardware element 32 is operated in response to a control signal C received from the external control device or from another autonomous assembly, which is received by wireless communication unit 34 comprising a transceiver and other communication modules operating over the BLE or WiFi protocols for reduced energy consumption, and processed by processor 35. Circuitry 37 interfaces between processor 35 and functional hardware 32. A power source 39 supplies the power needed for the elements of multifunctional component 30.

Memory device 31, processor 35, circuitry 37, and, if needed, a set of sensors may be configured as a printed circuit board that is unique for each desired usage. Processor 35 executes code that is stored on memory device 31. In particular, as will be described hereinafter, processor 35 executes a mediating code (MC) 38 that assists a software developer in significantly reducing the time needed to provide an application for suitably integrating multifunctional component 30 with the autonomous assembly.

Figure 4:
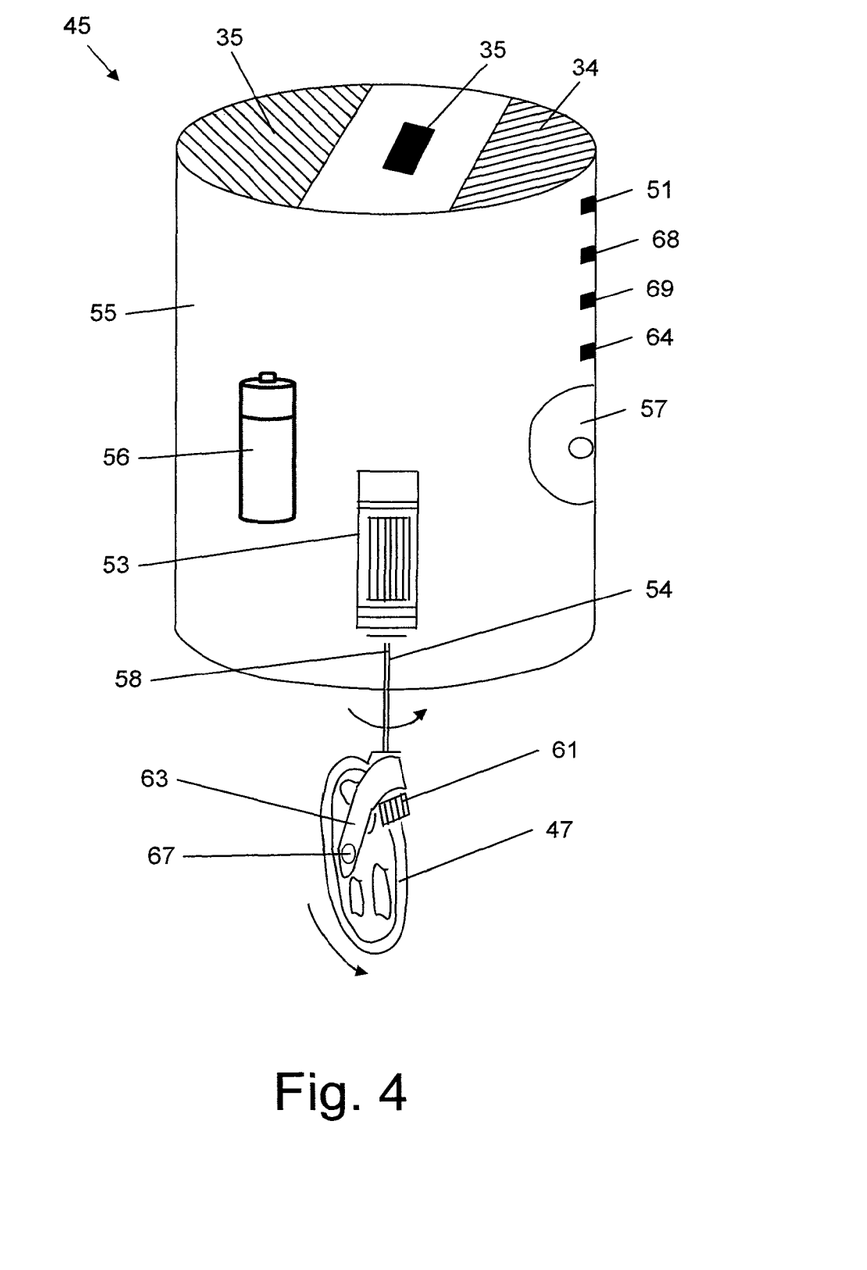
FIG. 4 is a schematic illustration in perspective view of a multifunctional drivable wheel component.

FIG. 4 schematically illustrates the configuration of an exemplary multifunctional component in the form of a drivable wheel component 45. Drivable wheel component 45 has a lower wheel 47 and an upper housing 55 that is configured with one or more elements 57 for engaging a structure of the autonomous assembly by a mechanical connection, such as a threadedly engageably connection, a snap connector, a push-pull connector, or any other connection well known to those skilled in the art.

Regarding the functional hardware elements, ground engaging wheel 47 is driven by a motor 53 retained within housing 55 and powered by battery 56, in response to control signals received from processor 35 by means of circuitry 37 and transmitted via wireless communication unit 34. Drive shaft 58 of motor 53 may be kinematically connected to a small drive wheel 61 in engagement with the upper periphery of ground engaging wheel 47, such that displacement of drive wheel 61 in one rotational direction will produce rotary movement of ground engaging wheel 47 in an opposite rotational direction. An outer sleeve 54 encircling drive shaft 58 is connected with fork 63 on which is mounted the wheel axle 67. To steer ground engaging wheel 47, an electromagnetic actuator, or alternatively a second motor, causes rotation of sleeve 54.

A plurality of sensors for detecting motion related parameters of ground engaging wheel 47 are also retained within housing 55, including an accelerometer 68 and gyro sensor 69. A GPS component 51 for sensing instantaneous location of component 45 and a touch sensitive panel 64 may also be provided.

Figure 5:
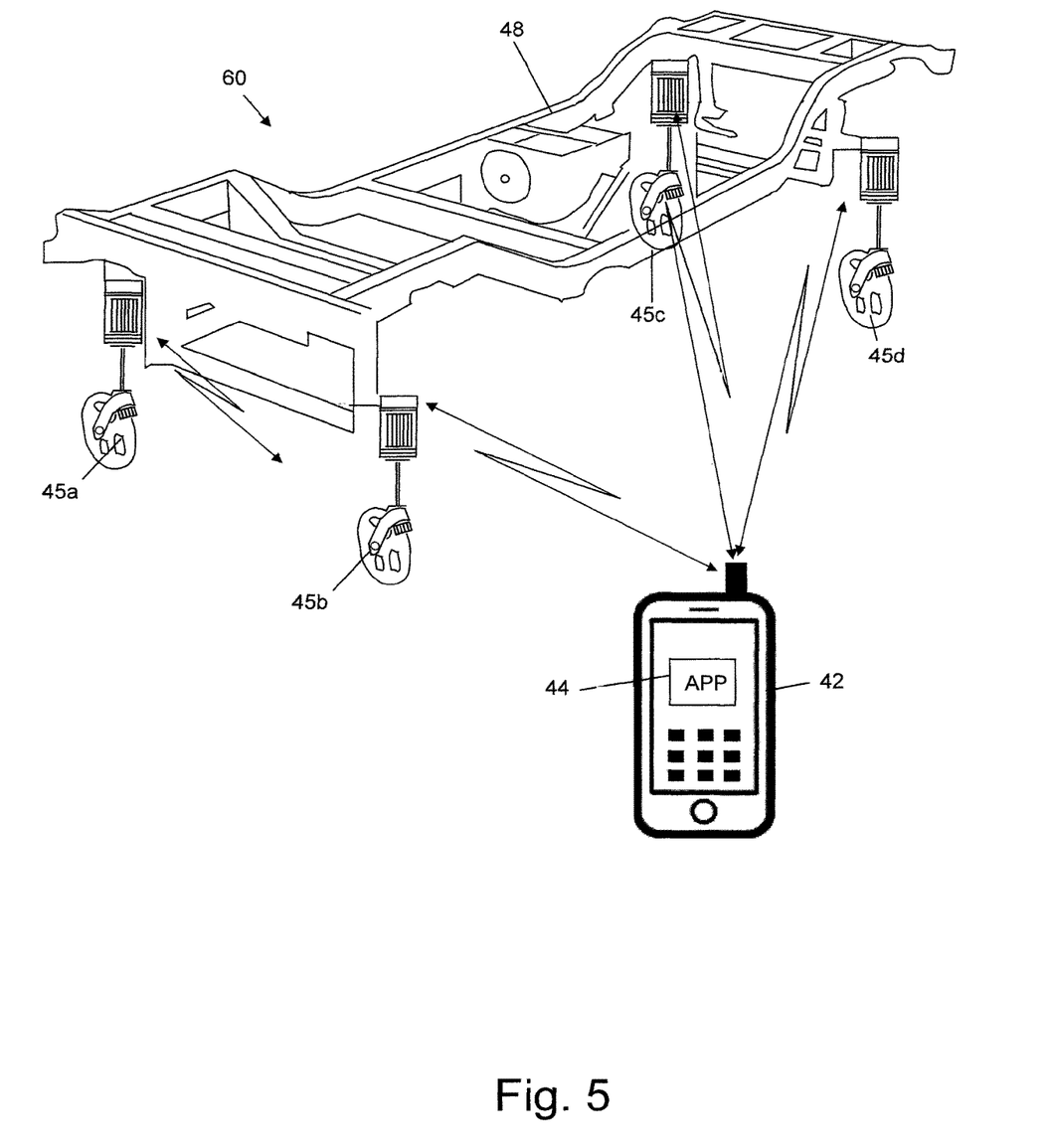
FIG. 5 is a perspective view of an autonomous toy car in which are mounted four wheel components of FIG. 4, showing the wireless communication with an external control device on which is running a dedicated application.

FIG. 5 schematically illustrates an autonomous toy car 60 that is assembled from four wheel components 45A-D and structure 48 resembling a car. A dedicated application 44 for initiating operation of each wheel component individually or of several wheels synchronously, and for coordinating operation of the four wheel components 45A-D collectively runs on smartphone 42 serving as the external control device.

By suitably manipulating smartphone 42, a user may command toy car 60 to advance forwardly or rearwardly, depending on the rotational direction of the wheels, or to make turns in response to a steering operation performed on front wheel components 45A and 45B. An acceleration initiating command may be transmitted to accelerometer 68 of toy car 60, in order to simulate for example a pursuit operation performable by a police car with respect to a thief car, as described hereinabove. When all wheels of toy car 60, i.e. each wheel of components 45A-D, are rotated in unison by 90 degrees, toy car 60 may be advanced sideways, a type of motion that cannot be achieved by any known prior art toy.

The wheel components 45A-D may be easily detached from toy car 60 and be attached to any other wheeled structure, for example to produce a motorcycle assembly. The gyro sensor will detect precession of the wheel, and the processor will command initiation one or more of a steering operation, a rotational change operation or a speed change operation in response to the detected precession in order to maintain stability of the toy motorcycle while turning.

Similarly the wheel component may be attached to a two wheeled structure in which the axles of the two independently driven wheels are laterally spaced and normally coaxial while a control loop maintains stability during both an unchanging position mode and a changing position mode, whether turning or advancing along a straight path.

The wheel component may also be attached to a unicycle structure so as to be self-stabilizing, or be operable independently of any structure by virtue of the self-contained motor, sensors, communication device and circuitry.

A user may benefit from an entertaining activity when a group of structure-independent wheel components are deployed. The group of wheel components may function as any of the previously described structures, or similar to any other desired structure, while being simultaneously driven and direction controlled. Any desired number of wheel components may be employed, for example to provide the sensation of a military formation. The housing of a wheel component may be uniquely configured to enhance user entertainment, or may be provided with specialized equipment, such as a camera, e.g. a panoramic wide angle camera, for a stabilized image capturing operation.

The wheel component may be easily implemented for a different usage by attaching it to a desired structure and producing a quick to develop dedicated application for the selected usage with use of a mediating code that functions as a software building block.

Prior art software development of an application for converting user initiated inputs into desired physical actions of a programmable autonomous device is a time consuming task. The software developer has to learn the specifications and protocols of each hardware element of the device, and also the designed interaction between the various elements. Following the learning stage, suitable code needs to be prepared for generating a predetermined physical output to a hardware element, usually a predetermined voltage or current, by which the hardware element is caused to operate in a desired fashion in response to the user initiated input.

A software developer kit (SDK) is often used by the software developer to facilitate preparation of the application. The SDK may include various programs such as a visual screen builder, an editor, a compiler, a linker, and an application programming interface.

However, the application prepared by the developer is usage-specific, and the time consuming process has to be repeated for implementing a different usage. Thus with respect to the exemplary wheel component 45 described hereinabove in FIG. 4, a first application has to be prepared when assembled in a four-wheeled structure and a second application has to be prepared during a similar time consuming operation when assembled for example in a motorcycle structure, according to prior art application development methods.

In one embodiment of the invention, primarily for use in the context of multifunctional components defining a first autonomous assembly as described hereinabove that can be detached therefrom in order to be coupled to, and to define thereby, a second assembly, a bi-directional mediating code for enhancing usage compatibility is executable on the component controller.

The mediating code is advantageously prepared by the service provider, rather than by the software developer, while taking into account the specifications and protocols of each hardware element of the multifunctional component, in order to generate a predetermined physical output to a hardware element that will be in response to any user initiated input made with respect to an anticipated component usage. The service provider upgrades the component, which was previously produced by a manufacturer, by injecting the mediating code into the memory device of the processor. The service provider also supplies the software developer with an enhanced SDK, which is interfaceable with the injected mediating code. The software developer, upon accessing the mediating code by the enhanced SDK kit, is able to build the application by simply defining a plurality of high level logic commands that are representative of the anticipated user inputs. These logic commands interface with the logic to physical commands of the mediating code in order to generate a physical action. Thus the application development time is significantly reduced as compared to the prior art.

For example, a mediating code for a light control component is controlled by the following four logic commands: turn on, turn off, change emitted light color and change light intensity.

Figure 6:
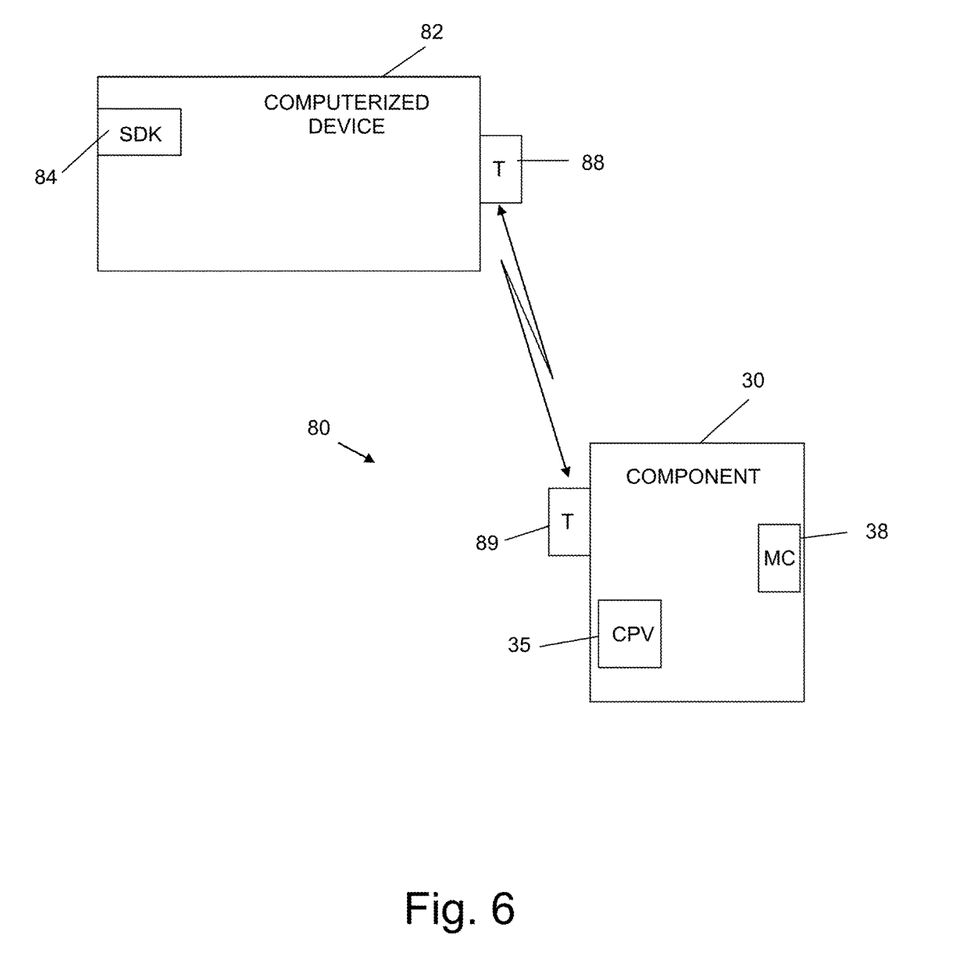
FIG. 6 is a schematic illustration of a software development system, according to one embodiment of the present invention.

FIG. 6 illustrates software development system 80 by which the software developer is able to access the mediating code 38. Software development system 80 comprises computerized device 82, such as a work station, on which is running an enhanced SDK platform 84. In this development mode, computerized device 82 is in data communication, whether wirelessly or by a wired connection, with multifunctional component 30, and particularly its processor 35 adapted to execute mediating code 38, via transceivers 88 and 89. Thus the software developer is able to access mediating code 38 for the purpose of building the desired application.

Figure 7:
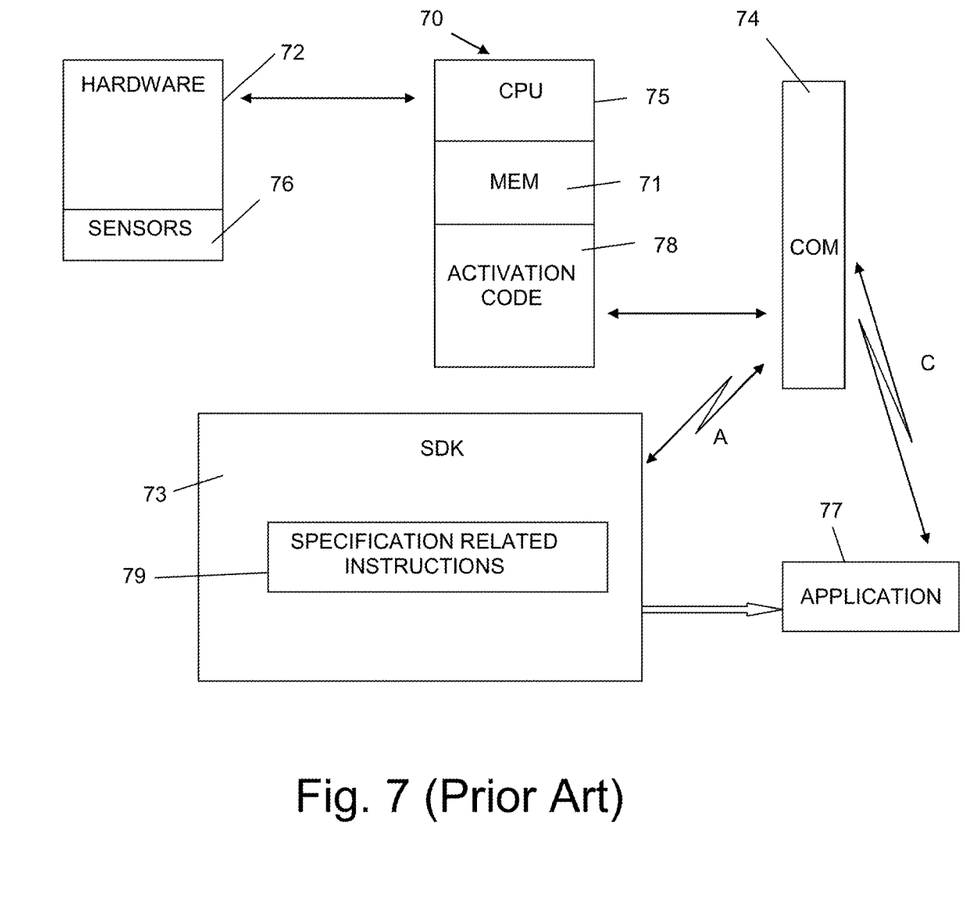
FIG. 7 is a schematic illustration of a prior art controller layout for assisting a software developer in building an application for a controllable toy in conjunction with a prior art SDK platform.

In order to appreciate the utility of the use of mediating code, reference will be first made to FIG. 7, which schematically illustrates a prior art controller layout for assisting a software developer in building an application 77 for a controllable toy.

The controllable toy is configured with functional hardware 72 for generating a controlled physical action. The operation of a physical action is commanded by processor 75 of controller 70, in response to a user selected control signal transmitted by a remote control device on which is running the application, or in response to a signal representative of a predetermined sensed condition and transmitted to the application by one or more sensors 76 provided with the functional hardware 72, whereupon an application generated control signal C is transmitted to communication device 74, generally comprising a short range transceiver.

Controller 70 also comprises firmware based activation code 78, which is stored in memory device 71 and executed by processor 75, serves as the intermediary between communication device 74 and processor 75. Activation code 78 provides the instructions to processor 75 as to which hardware element is to be activated and as to which physical output is to be outputted to the activated hardware element, in response to the application generated control signal received via communication device 74. The physical output is generally a voltage output or a current output of a specific magnitude fed to the activated hardware element that is suitable for generating a desired action under corresponding controlled operating conditions. An increase in voltage output, for example, would cause the hardware element to operate at a faster speed.

Through the interaction of communication device 74, the software developer is able to access activation code 78 by means of conventional SDK platform 73 running on a computerized device adapted to build an application for a specific controllable toy and of accession signal A periodically transmitted by activation code 78. As the instructions of activation code 78 are in a machine type language (that may be a low level language) in order to communicate with processor 75, the SDK instructions 79 used for building an application 77 that is to communicate with, and command, activation code 78 are necessarily interfaceable with the machine type language.

In addition to the difficulty in preparing machine language interfaceble instructions, the software developer is faced with various time consuming operations in order to define SDK instructions 79 for each hardware element, including learning its specifications, determining the anticipated operating conditions for the intended usage of the toy, determining the required processor output for achieving each operating condition in accordance with the specifications, learning the content of the application code, and preparing instructions that are suitably interfaceable with the activation code in order to generate the desired processor output.

Exemplary SDK instructions 79 include (1) output 4.2V to hardware element 1 to generate activity A, (2) output 4.4V to hardware element 1 to generate activity B, (3) output −4.4V to hardware element 1 to generate activity C, (4) output 3.6 mA to hardware element 2 to generate activity F, and (5) output 3.8 mA to hardware element 2 to generate activity G, although the syntax of each instruction is modified so as to interface with the activation code.

Figure 8:
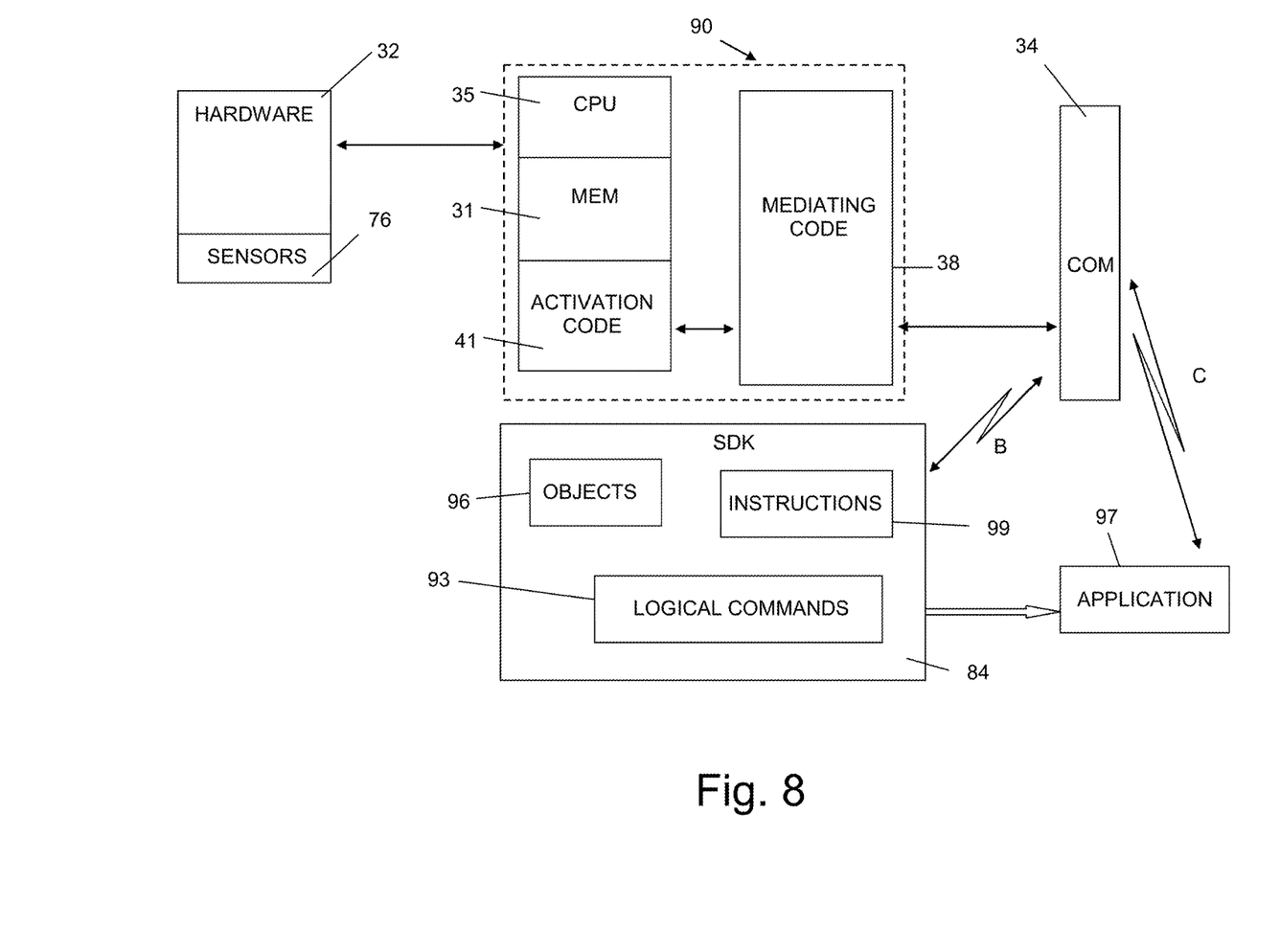
FIG. 8 is a schematic illustration of the layout of a controller mounted in the component of FIG. 3, showing the cooperation between a mediating code and an enhanced SDK platform.

FIG. 8 illustrates the layout of component mounted controller 90, according to one embodiment of the invention. Mediating code 38 is interposed between short-range wireless communication unit 34 and activation code 41. Since mediating code 38 is interposed between wireless communication unit 34 and activation code 41, the software developer interacting with enhanced SDK platform 84 is able to access mediating code 38 during the periodic transmission of accession signal B via communication unit 34. In addition to transmitting accession signal B, mediating code 38 is adapted to neutralize the transmission of accession signal A (FIG. 7) from activation code 41.

Following transmission of accession signal B, the software developer is able to access mediating code 38 by causing an object 96 representative of the mediating code and of the specific component intended to be controlled by the application, such as a graphical object or a logical object, to be embedded in enhanced SDK platform 84 in accordance with the object oriented programming technique and to be displayed. A typical graphical object may be an icon in the form of a wheel being representative of wheel component 45 illustrated in FIG. 4. Thus when object 96 is selected, a call function accesses all mediating code libraries related to the given component.

A software developer interacting with enhanced SDK platform 84 is advantageously able to define intuitively clear, high level logic commands 93, rather than having to undergo the time consuming process of defining physical parameters as required by a prior art SDK platform, for the purpose of building an application 97 to run on the external control device and to coordinate the operation of the autonomous assembly. The SDK logic commands 93 define those specific operations that are performable by the autonomous assembly and that will be used by a user of application 97 when commanding operation of the autonomous assembly, or of an individual multifunctional component, and are not executable by application 97 (but rather are of a higher level than the executable instructions). Regarding the wheel component, exemplary logic commands 93 include (1) move forward, (2) move backwards, (3) turn to the right, (4) accelerate, and (5) stop.

After a set of the logic commands has been satisfactorily defined, the software developer enters instructions 99 that are associated with each logic command. Each of these instructions relates to various actions that have to be carried out by one or more hardware elements, whether in the same component or in different components, so that the given logic command will be fulfilled within the context of a given autonomous assembly and in accordance with predetermined parameters.

It is to be noted that the parameters defined by these instructions 99 characterize an action to be performed by the component. On the other hand, the activation code defines a processor output in terms of signal values required for the operation of the hardware element. For example, if the developer requires that the component will move forward at a speed of 10 mph, the logic command will be "MOVE FORWARD; 10 MPH", The parameters defined by these instructions in terms of signal values may be for example (depending on the hardware specification) "positive polarity; 3.5 V". In this example, the wheel will rotate clockwise (to produce a forward movement) at a rotational speed of 50 rpm which results in a linear movement of 10 mph (depending on the wheel diameter). Of course, negative polarity will result in counterclockwise rotation at the same speed.

Additional instructions 99 are entered by the software developer for the design of the user interface. It is to be noted that these instructions may also be written in a high level language.

At the end of the development stage, the software developer compiles the logic commands 93 and instructions 99 so as to be convertible to an application by enhanced SDK platform 84. Application 97 is accordingly built and ready to be installed on the external control device.

Enhanced SDK platform 84 facilitates speedy application development by being able to cooperate with mediating code 38, which is developed by the service provider. The service provider embeds mediating code 38 into memory device 31 after activation code 98 has already been embedded in the memory device by the component manufacturer. Mediating code 38 is developed by the service provider in such a way so as to define on one hand machine language interfaceable instructions transmittable to activation code 41 for generating all types of physical processor output needed for any anticipated component usage, and on the other hand to interface with SDK logic commands needed to build application 97.

Mediating code 38 is advantageously bi-directionally operable, being exportable outwardly from controller 90 in order to be accessed by enhanced SDK platform 84, as described above, and also adapted to selectively interface with activation code 41 upon receiving control signal C transmitted from application 97 running on the external control device by means of communication unit 34, in order to initiate operation of a desired physical action by functional hardware 32. Control signal C is representative of a logic command selected by the user on the user interface of the external control device, and is able to interface with mediating code 38. Mediating code 38 in turn is able to interface with activation code 41 so that suitable instructions will be transmitted to the processor as to which hardware element is to be activated and as to which physical output is to be outputted to the activated hardware element.

The processor output fed to the activated hardware element is generally voltage or current of a specific magnitude that is suitable for generating a desired action under corresponding controlled operating conditions. An increase in voltage output, for example, would cause the hardware element to operate at a faster speed. In order to reduce battery consumption, circuitry for modulating the pulse width may be interposed between the battery and the hardware element, to produce an accurate predetermined pulse width and average voltage after receiving the processor output.

At the same that activation code 41 is commanded by mediating code 38 to selectively communicate with the processor, the activation code may be commanded to periodically output a unique non-application generated component identifier that is transmittable via communication unit 34 to a different component or to a different autonomous assembly.

Communication between different assemblies enables a predetermined action to be generated when one assembly approaches a second assembly within a predetermined proximity, for example the second assembly may be in the form of a dog which is programmed to bark when the first assembly in the form of a cat approaches the second assembly. GPS components may be employed to determine the proximity. The dog assembly may also bark at a predetermined time in coordination with a user's alarm clock, approach the user, and then contact him so that the user will be encouraged to wake up.

The ability afforded by enhanced SDK platform 84 to build an application by entering easy and quick to define logic commands that are able to cooperate with mediating code 38 contributes to the interchangeability of the multifunctional component. When it is desired to change the usage for the component, for example to be mounted in a different structure, the software developer speedily defines different logic commands 93 and instructions 99 that are suitable for the new usage. The savings in time needed to develop an application reduces costs, and makes the multifunctional component more affordable to the end user.

In another embodiment, the mediating code is developed in such a way so as to include the features of the activation code. That is, the mediating code may be provided with a first module for communicating with the processor by a machine type language (that may be a low level language), a second module for communicating with the enhanced SDK platform or with the application by a high level language, and a third module for interfacing between the first and second modules.

Figure 9:
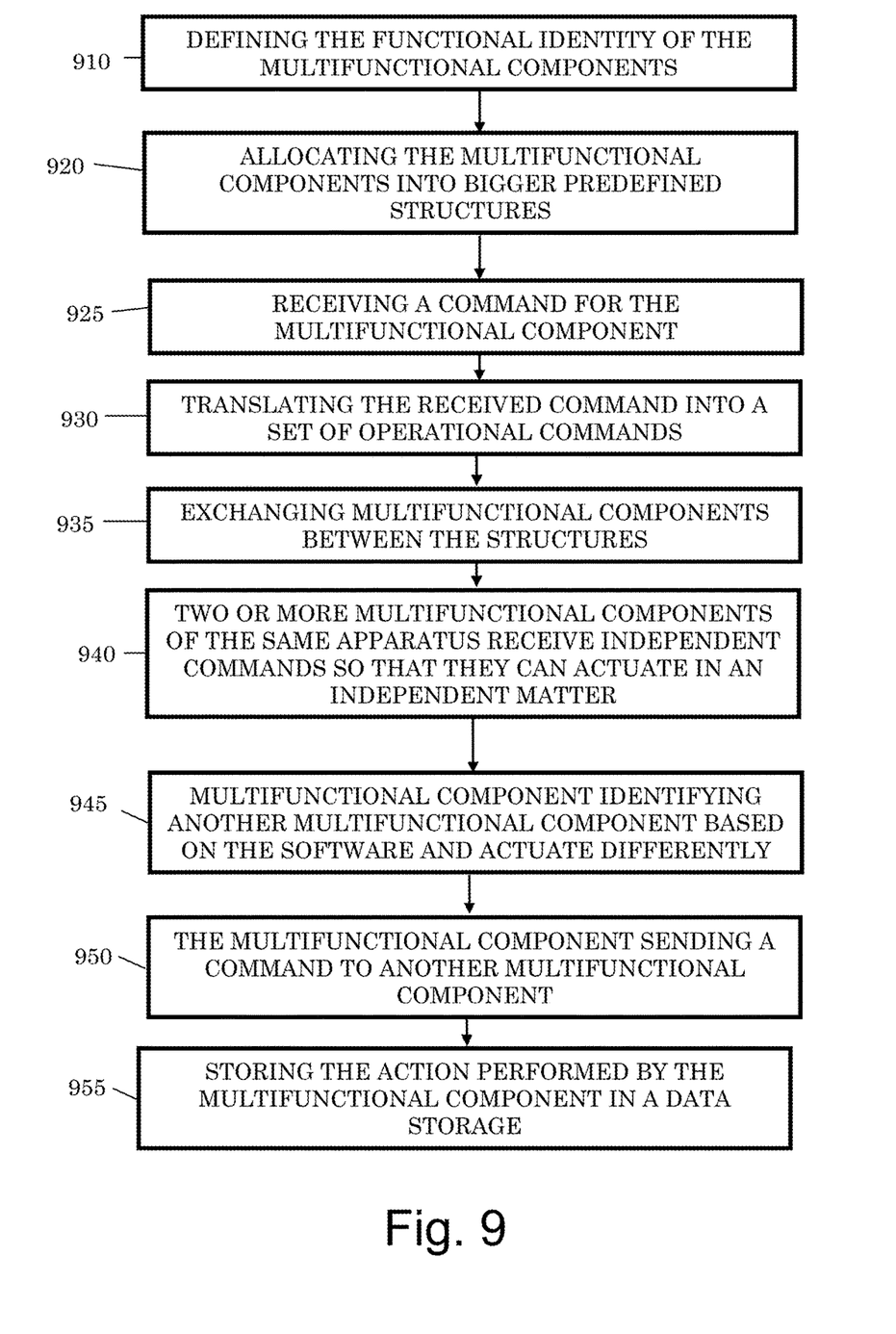
FIG. 9 is a schematic illustration of a method of utilizing the component of FIG. 3.

FIG. 9 is a schematic illustration of a method of utilizing the component of FIG. 3. Step 910 discloses defining the functional identity of the multifunctional components. Such definitions may be stored in a server communicating with several multifunctional components. The identity may include a unique ID of the multifunctional components as well as characteristics, apparatuses configured for the multifunctional components or type of multifunctional components and the like.

Step 920 discloses allocating the multifunctional components into bigger predefined structures, on an ad hoc basis, creating apparatuses. For example, allocating 4 multifunctional components to 4 vehicles, thus forming a larger vehicle or a group of coordinated vehicles or a group of dolls walking according to the same commands, velocity and direction.

Step 925 discloses receiving a command to change a position, velocity, status or behavior of an apparatus operated by one or more multifunctional components. The command may be received from a control device operated by a user of the structure. Alternatively, the command may be received from a server communicating with the apparatus or with the multifunctional component, for example in response to a predefined event, such as detection of another apparatus, change in weather and the like. The command may be received from another multifunctional component, as detailed below. The commands may be generated by the users, or between multifunctional components, or from the server, or from any adaptive server in a specific location that receives a set of rules for controlling multifunctional components form the cloud. Such command may be to raise a robot's arm, while the robot is the structure and the multifunctional component is mounted on the robot's arm.

Step 930 discloses translating the received command into a set of operational commands that are sent to the multifunctional components. For example, the user's command is to raise a robot's arm but the translation provides that operational commands are sent to two or more multifunctional components, one mounted on the arm and the other on the robot's head. Translating of the received command into operational commands may be performed at the user's control device, such as a smartphone, at a server or at the multifunctional components themselves. For example, in case two multifunctional components associated with separate apparatuses interact with each other, the server is likely to translate the user's command into operational commands. Similarly, translation into operational commands may dictate different velocity or direction to different multifunctional components of a single vehicle, as the multifunctional components control the vehicle's wheels. In some cases, the 4 wheels may move without a vehicle body, as long as they are configured to maintain their balance.

Step 935 discloses exchanging multifunctional components between the structures. For example, when a user of the apparatus wishes to use some structures differently, the user may replace multifunctional components of the apparatus or add multifunctional components to the apparatus.

Step 940 discloses the two or more multifunctional components of the same apparatus receive independent commands so that they can actuate in an independent matter. For example, when a vehicle comprises 4 multifunctional components to operate the vehicle's 4 wheels, some wheels may have to move faster than others, for example when the vehicles turns left, or when the vehicle simulates a 4×4 drive.

Step 945 discloses the multifunctional component identifying another multifunctional component based on the software and actuate differently. One multifunctional component can capture an image of another multifunctional component communicate via NFC, BLE (Bluetooth low energy) or scan a multifunctional component ID. The multifunctional component can then actuate or behave differently, for example according to the identity or attribute or relative location of the identified multifunctional component.

Step 950 discloses the multifunctional component sending a command to another multifunctional component. Such command may alter the function or behavior of the other multifunctional component.

Step 955 discloses storing the action performed by the multifunctional component in a data storage. The information stored in the data storage may later be used for analyzing a multifunctional component functionality, user's behavior, interaction between multifunctional components and the like. It should be noted that some of the steps or actions performed in the method disclosed above are only optional and various combinations of the steps disclosed above may be performed by any element disclosed in the subject matter. Any combination of steps is included in the scope of the subject matter.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:
1. A multifunctional component, comprising:
a) one or more functional hardware elements for generating a desired physical action;
b) a processor for selectively activating one or more of said functional hardware elements in response to a control signal received from a control device;
c) a wireless communication unit in communication with said control device by which said control signal is transmitted to said processor; and
d) a memory device in which are embedded an activation code and a mediating code being executable by said processor;
wherein said activation code is communicatable with said processor to initiate an output from said processor which is configured to generate said physical action;
wherein the mediating code interfaces with an SDK platform to enable software developers to develop software to use the multifunctional component;
wherein the mediating code is communicatable with said activation code by converting high level logic commands stored in the software of the software developers to corresponding instructions representing one or more physical parameters required by said one or more activated hardware elements to generate said desired physical action.

2. The multifunctional component according to claim 1; further comprising one or more elements for releasably engaging a structure by a mechanical connection.

3. The multifunctional component according to claim 2; wherein the wireless communication unit is configured to communicate with another wireless communication unit of another component.

4. The multifunctional component according to claim 1; wherein the mediating code is written by a service provider and is compatible with a protocol of each hardware element of the component, in order to generate a predetermined physical output to the hardware element in response to a user initiated control signal.

5. The multifunctional component according to claim 1, wherein the mediating code is configured with a first activation code module for communicating with the processor to generate the physical outputs, a second module for communicating with an SDK platform or with a software application for controlling the component written using a high level language, and a third module for interfacing between said first and second modules.

6. An autonomous assembly, comprising a plurality of the multifunctional components according to claim 1, wherein the control device is operable to coordinate the physical actions performable by the plurality of multifunctional components.

7. The autonomous assembly according to claim 6, wherein two or more of the plurality of the multifunctional components have different actuating capabilities that are coordinated to produce unique autonomous assembly functionality.

8. The autonomous assembly according to claim 7, wherein at least a portion of the plurality of the multifunctional components are detachable therefrom and coupleable to another assembly.

9. The autonomous assembly according to claim 6, wherein the activation code is adapted to output a unique non-application generated component or assembly identifier configured to identify the assembly.

10. The autonomous assembly according to claim 9, wherein the identifier is transmittable via the communication unit to a different component or to a different autonomous assembly.

11. The autonomous assembly according to claim 10, wherein the processor performs a predetermined action when a first assembly receives the identifier of a second assembly and is located within a predetermined proximity from said second assembly.

12. The autonomous assembly according to claim 10, wherein said mediating code is communicatable with an software developer kit (SDK) platform for facilitating development of a dedicated application runnable on said control device with use of high level logic commands, and with said activation code by converting each of said high level logic commands to corresponding instructions representing one or more physical parameters required by said one or more activated hardware elements to generate said desired physical action.

13. The multifunctional component according to claim 1, further comprises one or more sensors for sensing a predetermined sensed condition and sending a signal to another device.

14. The multifunctional component according to claim 1, further comprises one or more multifunctional and drivable wheel components, each of said wheel components comprising:
a) a housing defining a periphery of said component;
b) a motor mounted within said housing;
c) a power source for powering said motor;
d) a steerable and ground engageable wheel driven by said motor;
e) a wheel processor for selectively activating said motor in response to a control signal received from an external control device;
f) a wireless communication unit in communication with said control device by which said control signal is transmitted to said wheel processor; and
g) one or more elements for releasably securing said housing to a structure of said autonomous toy.

15. A software development system configured to control a multifunctional component comprising one or more functional hardware elements for generating a desired physical action, a processor for selectively activating one or more of said hardware elements in response to a control signal received from a control device, a wireless communication unit in communication with said control device by which said control signal is transmitted to said processor and a memory device in which are embedded an activation code and a mediating code being executable by said processor, the software development system comprises:
a computerized device on which is running an SDK platform for facilitating development of a dedicated application runnable on said control device with use of high level logic commands,
said SDK platform interfaces with the mediation code and provides a software developer of the dedicated application access to the mediation code, such that the dedicated application comprises high level logic commands representing anticipated user commands,
wherein said activation code is communicatable with said processor to initiate a physical output from said processor which is configured to generate said action, wherein the mediating code interfaces with an SDK platform to enable software developers to develop software to use the multifunctional component, and wherein said mediating code is communicatable with said activation code by converting said high level logic commands to corresponding instructions representing one or more physical parameters required by said one or more activated hardware elements to generate said desired physical action.

16. The software development system according to claim 15, wherein the high level logic commands that interface with the mediating code are representative of a set of operations that are performable by the multifunctional component or by an autonomous assembly comprising a plurality of the multifunctional components.

17. The software development system according to claim 16, wherein instructions that define parameters of each operation corresponding to one of the high level logic commands or of a user interface to be generated are enterable into the enhanced SDK platform.

* * * * *